United States Patent
Fritzsche

(10) Patent No.: US 6,515,396 B1
(45) Date of Patent: Feb. 4, 2003

(54) STATOR FLUX RING HAVING FASTENABLE POLE PIECES AND METHOD OF MAKING SAME

(75) Inventor: Harold L. Fritzsche, Rapid City, SD (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,146

(22) Filed: Nov. 27, 2001

(51) Int. Cl.$^7$ ................................................. H02K 1/00
(52) U.S. Cl. ........................ 310/216; 310/218; 310/254
(58) Field of Search ........................ 310/42, 216, 217, 310/218, 254, 258, 259; 29/596–598

(56) References Cited

U.S. PATENT DOCUMENTS

| | | |
|---|---|---|
| 2,323,114 A | 6/1943 | Bradford et al. |
| 2,877,366 A | 3/1959 | Carr |
| 2,975,312 A | 3/1961 | Ploran |
| 3,202,851 A * | 8/1965 | Zimmerle et al. ........... 310/216 |
| 3,283,399 A * | 11/1966 | Hart et al. .................... 29/598 |
| 3,577,851 A * | 5/1971 | Detheridge et al. ......... 310/216 |
| 3,650,022 A | 3/1972 | Stone |
| 3,708,706 A * | 1/1973 | Akiyama et al. ........... 310/216 |
| 3,886,256 A * | 5/1975 | Ohuchi et al. .............. 310/216 |
| 4,149,309 A | 4/1979 | Mitsui |
| 4,156,168 A | 5/1979 | Vogel |
| 4,202,196 A * | 5/1980 | Asai et al. .................... 29/596 |
| 4,395,815 A * | 8/1983 | Stanley et al. ................ 29/598 |
| 4,578,853 A | 4/1986 | Würth |
| 4,613,780 A * | 9/1986 | Fritzsche ..................... 310/216 |
| 4,794,778 A * | 1/1989 | Fritzsche ..................... 29/596 |
| 4,816,711 A | 3/1989 | Fritzsche |
| 4,909,057 A | 3/1990 | Fritzsche |
| 5,168,662 A | 12/1992 | Nakamura et al. |
| 5,625,239 A | 4/1997 | Persson et al. |
| 5,918,360 A * | 7/1999 | Forbes et al. ................. 29/596 |
| 6,448,685 B1 * | 9/2002 | Mayer et al. ............... 310/254 |

* cited by examiner

*Primary Examiner*—Tran Nguyen
(74) *Attorney, Agent, or Firm*—Welsh & Katz, Ltd.

(57) ABSTRACT

A stator core is formed of helical convolutions wound edgewise from a continuous strip of ferromagnetic material. The core is in the from of a plurality of flux rings having a plurality of spaced apart integrally formed lugs outwardly extending along an outer circumferential edge of the flux ring, where each lug has deformable edges. Pole pieces are fastened to the flux rings and each flux ring has a body portion defined by an annular front portion. The body portion has first and second arms that project laterally from the body portion and extend along a portion of the outer circumferential edge. Each pole piece is operatively secured between two adjacent lugs such that the annular front portion abuts the outer circumferential edge of the flux ring. When secured, the arms abut the corresponding deformable edges of the lug. A portion of the deformable edges of the lug are then deformed and expand to overlap the arms to wedge pole piece between the circumferential edge and the lugs.

12 Claims, 4 Drawing Sheets

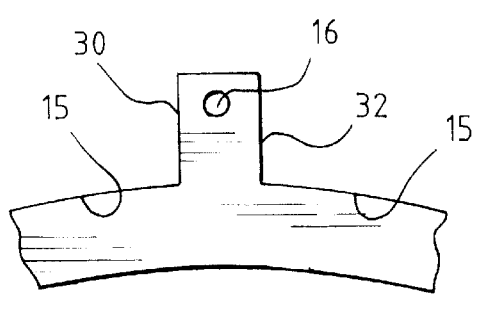
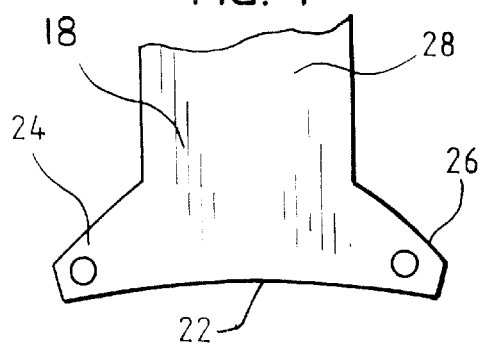
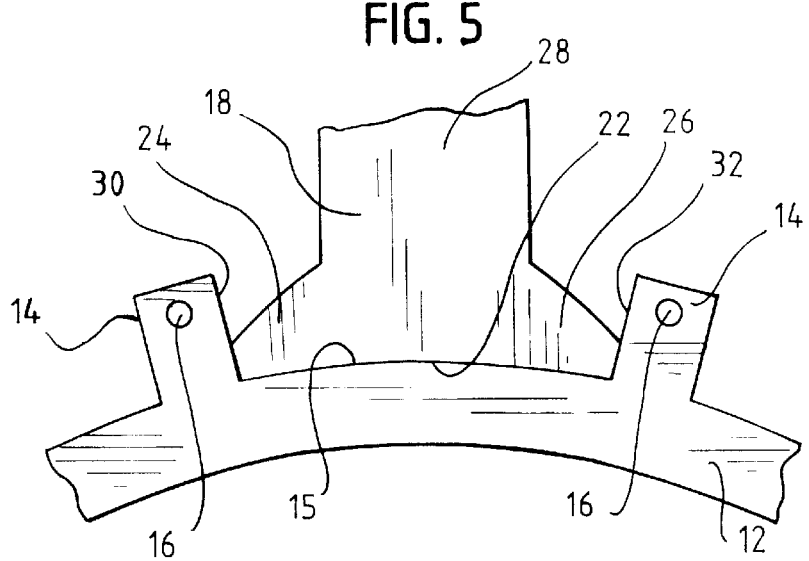
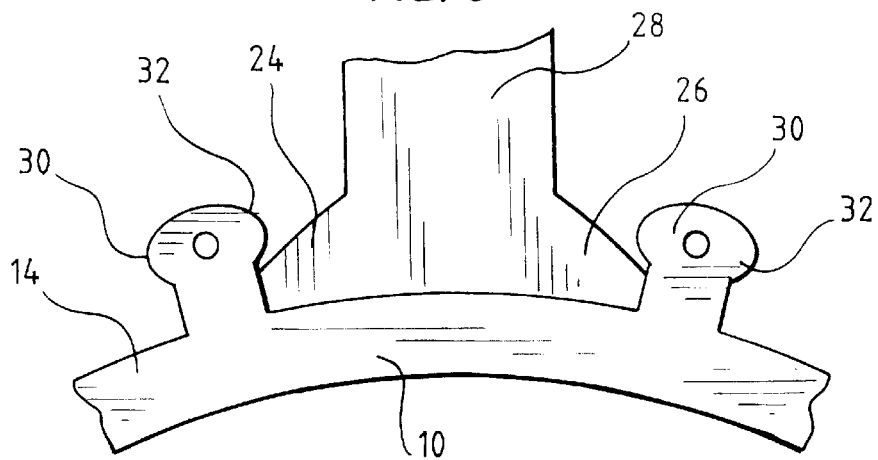

STATOR FLUX RING HAVING FASTENABLE POLE PIECES AND METHOD OF MAKING SAME

BACKGROUND OF INVENTION

The present invention relates generally to stator assemblies and more specifically to a stator flux ring having fastenable pole pieces and a method for making same.

Dynamoelectric machines, such as electric motors, are ubiquitous in electro-mechanical products, such as in air compressors, refrigerators, washing machines, dishwashers and the like. It is important to be able to manufacture such motors efficiently and at a minimum cost.

Conventional motors include a stator core and a rotor that typically rotates within the stator core. Known stator cores are formed by stacking a plurality of stamped ferromagnetic discs to form a yoke. The discs are laminated and stacked in an aligned relation. It is also known to form a core by continuously winding a lanced strip of ferromagnetic material edgewise about an arbor. The strip is continuous and may have pole cavities or teeth formed therein. Stator windings are then wound about the teeth, which are generally distributed evenly about the inner circumference of the stator core. U.S. Pat. No. 4,578,853 to Wurth issued on Apr. 1, 1986 discloses a stator core formed of stacked laminations. However, the number of poles are fixed. Additionally, because the poles are integrally formed with the laminations, their shape cannot be changed with modifying the basic lamination.

It is also known to use adhesive material to fasten pole pieces to laminations comprising the stator core. Such methods are relatively expensive due to labor costs associated with the gluing operation. Additional costs are incurred because the stator must remain immobile until the adhesive cures. Alternately, the stator core is baked to cure the adhesive, which also increases the costs of such methods.

SUMMARY OF INVENTION

The disadvantages of known stator cores and method of manufacturing such stator cores are substantially overcome with the present invention by providing a novel stator flux ring having fastenable pole pieces. The present flux ring and method permits a stator core or yoke to be formed economically and with high reliability. Additionally, stator cores manufactured according to the present method provide manufacturing flexibility because pole pieces of different sizes and shapes may be used with existing flux rings. As described above, it is known to integrally form the pole pieces as teeth or projections of the stamped laminations. Accordingly, the pole has a constant size and shape. This may increase inventory and stocking costs because a slight variation in motor requirements may dictate that an entirely new stator lamination be used, which must also be stocked. For example, if a particular stator yoke permits the pole to be wound with a maximum of 30 turns of 20 gauge wire, then the number of turns using the same gauge wire cannot be exceeded. Accordingly each motor may require different flux ring construction.

In the present invention, however, if for example, a motor application requires 50 turns of 20 gauge wire, a pole piece of a different size or shape may be attached to the flux ring. A slightly larger pole piece, or one having a larger outward flair, may accommodate the additional turns of wire. In this way, the same flux ring may be used to manufacture many different stator cores because the pole pieces are separate from the flux ring to which they are attached. Additionally, the pole pieces are formed or shaped separately from the strip of material that forms the core. This significantly reduces the amount of material wasted in the stamping process compared to methods having the pole pieces integrally formed with the flux ring.

More specifically, the stator core of one embodiment of the present invention is in the form of helical convolutions of a continuous strip ferromagnetic material that is wound edgewise to form a stator core. The core includes a plurality of flux rings having a plurality of spaced apart integrally formed lugs outwardly extending along an outer circumferential edge of the flux ring, where each lug has deformable edges. Pole pieces are fastened to the flux rings, and the flux rings have a body portion defined by an annular front portion. The body portion also has first and second arms that project laterally from the body portion and extend along a portion of the outer circumferential edge of the flux ring when fixed thereto. Each pole piece is operatively secured between two adjacent lugs and abuts the outer circumferential edge of the flux ring. When secured, the arms abut the corresponding deformable edges of the lug. A portion of the deformable edges of the lug are then deformed and expand to overlap the arms and wedge the pole piece between the circumferential edge and the lugs.

BRIEF DESCRIPTION OF DRAWINGS

The features of the present invention which are believed to be novel are set forth with particularity in the appended claims. The invention, together with further objects and advantages thereof, may best be understood by reference to the following description in conjunction with the accompanying drawings.

FIG. 3 fragmentary top plan view of a specific embodiment of a flux ring showing a lug.

FIG. 4 is a top plan view of a specific embodiment of a pole piece;

FIG. 5 is a fragmentary top plan view of a specific embodiment of a single pole piece shown in alignment with the flux ring of FIG. 1;

FIG. 6 is a fragmentary top plan view of a specific embodiment of a single pole piece shown wedged against the flux ring;

DETAILED DESCRIPTION

In this written description, the use of the disjunctive is intended to include the conjunctive. The use of definite or indefinite articles in not intended to indicate cardinality. In particular, a reference to the object or thing or an object or a thing is intended to also describe a plurality of such objects or things.

Figure 1:
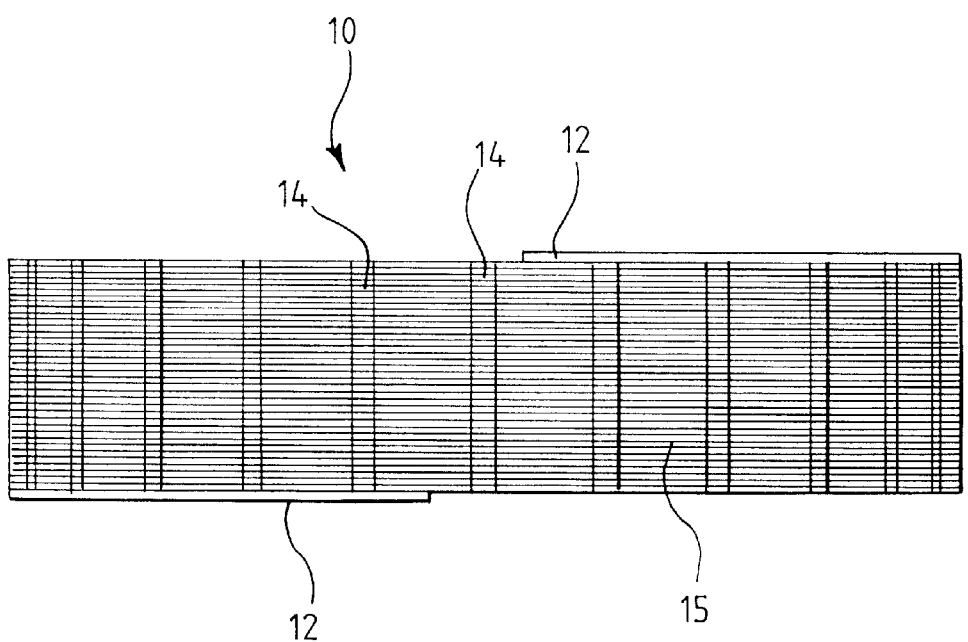
FIG. 1 is a side elevational view of a specific embodiment of a stator core.
Figure 2:
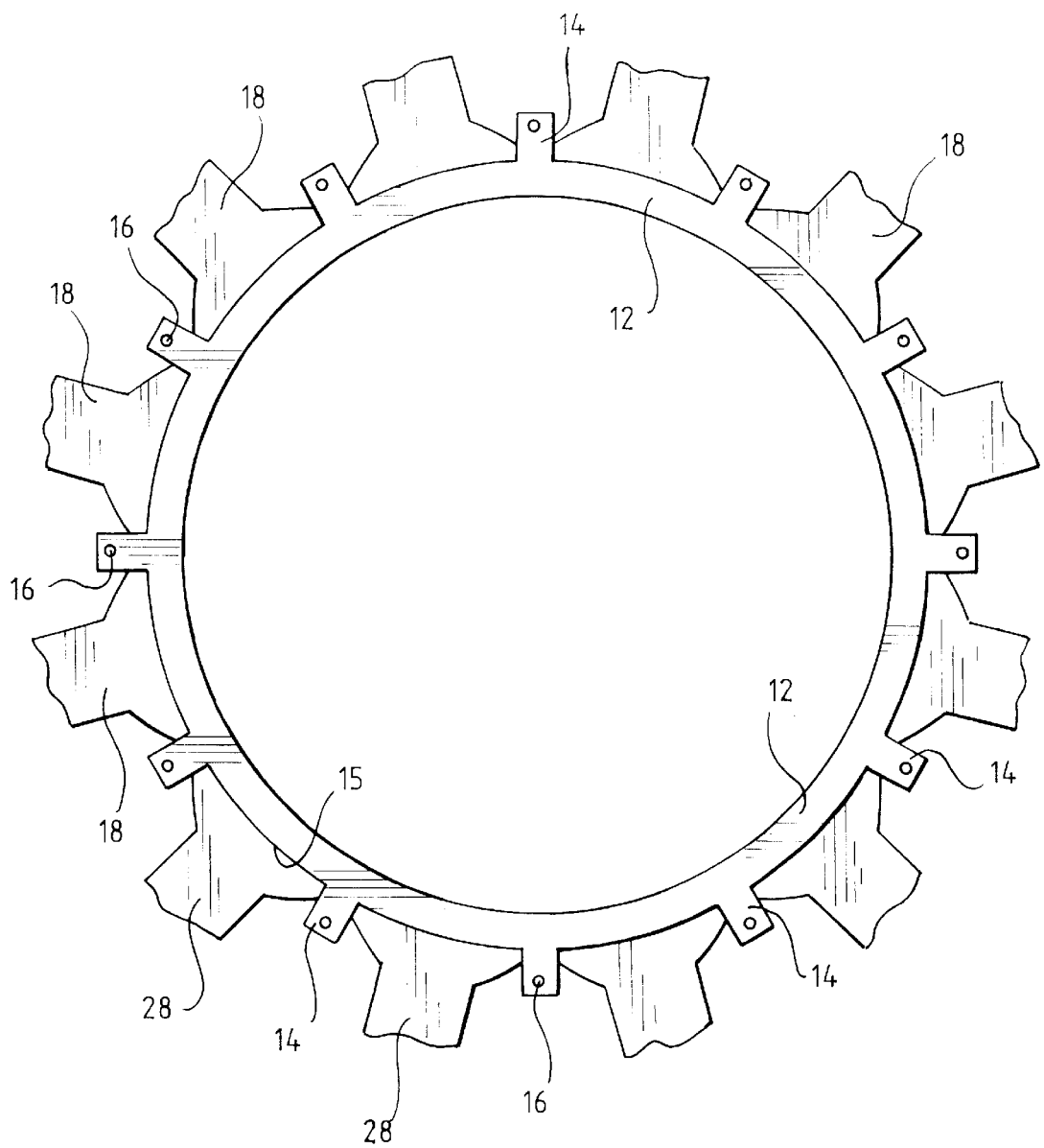
FIG. 2 is a top plan view of a specific embodiment of a flux ring.
Figure 7:
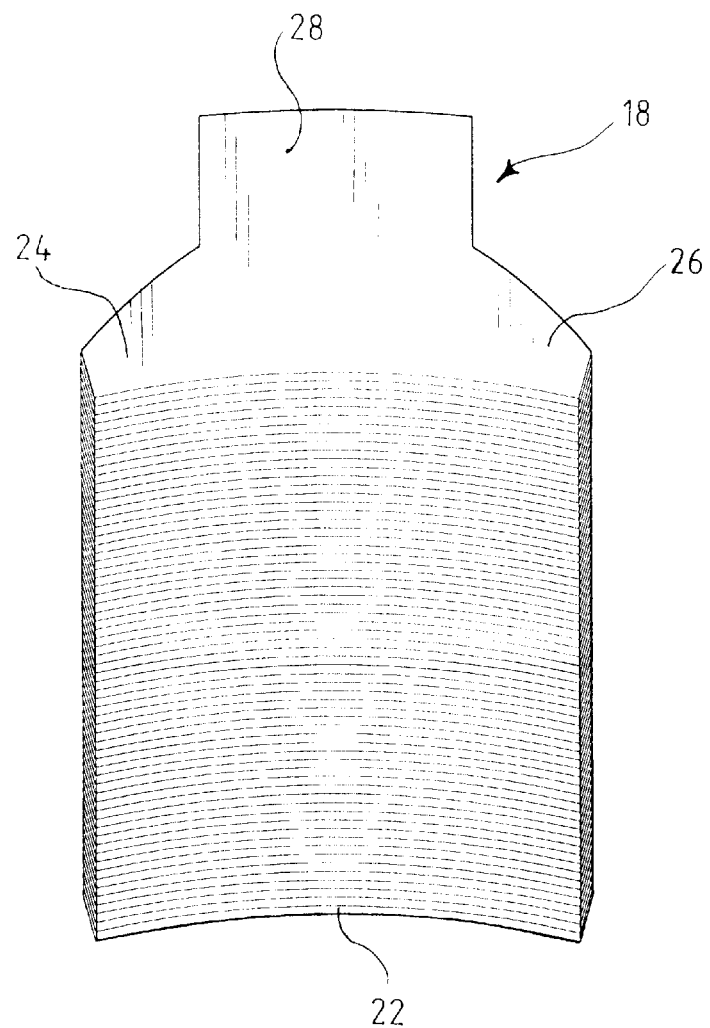
FIG. 7 is a perspective view of a plurality of stacked pole pieces ready for attachment to the core.
Figure 8:
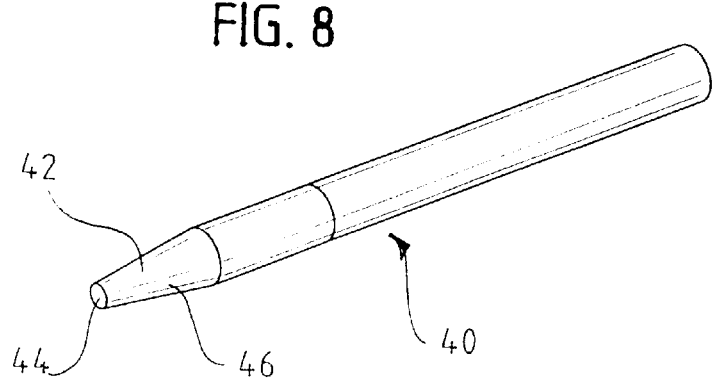
FIG. 8 is a perspective view of specific embodiment of a deforming tool.

Referring now to FIGS. 1 and 2, FIG. 1 illustrates a stator core 10, generally. The stator core 10 is formed from a plurality of flux rings 12, which is shown in greater detail in FIG. 2. Note that the flux ring 12 is not a single close-ended ring as might appear from the view of FIG. 2. Rather, the stator core 10 is formed by winding in an edgewise manner, a continuous lanced strip of ferromagnetic material through a bending zone about an arbor (not shown). Accordingly, the core 10 is a continuous strip of helical convolutions. The method for manufacturing such a stator core is described in detail in U.S. Pat. No. 4,909,057 issued to H. Fritzsche on Mar. 20, 1990, and owned by the assignee of the present invention. U.S. Pat. No. 4,909,057 is hereby incorporated by reference in its entirety. Although the stator core 10 is a continuous strip of edgewound ferromagnetic material, a single layer or turn of the stator core 10 will be referred to herein as the flux ring 12, or each flux ring for purposes of illustration, even though the flux ring is a continuous coil and is not a single close-ended ring.

Preferably, the flux rings 12 are manufactured by a cutting process, but any suitable process may be used. For example, according to one specific embodiment, the flux ring 12 may be formed by stamping, milling or punching the continuous strip of ferromagnetic material prior to winding about the arbor.

Referring now to FIGS. 2 and 3, each flux ring 12 includes a plurality of spaced apart lugs 14 that outwardly extend along an outer circumferential edge 15 of the flux ring. Each lug 14 is preferably evenly spaced about the circumference of the flux ring 12. The lugs 14 are integrally formed from the flux ring 12, and are also preferably stamped during the stamping process described above. Each lug 14 includes a lug aperture 16, which is also preferably stamped during the stamping process described above. However, any suitable method, such as drilling, may be used to form the lug aperture 16.

Referring now to FIGS. 2–4, FIG. 4 shows a specific embodiment of a pole piece 18. Note that any suitable number of lugs 14 may be disposed about circumference of the flux ring 12, depending upon the number of pole pieces 18 attached to the flux ring. In one specific embodiment shown in FIG. 2, each lug 14 is preferably disposed between two pole pieces. Accordingly, the number of lugs 14 equals the number of pole pieces 18. However, according to another embodiment, the pole pieces 18 may be disposed between adjacent pairs of lugs 14, rather than between each and every lug. In this embodiment, the number of lugs 14 is twice the number of pole pieces 18. Of course, some lugs 14 may remain unused, and some pole pieces 18 may be omitted, depending upon the specific motor construction.

As best shown in FIG. 4, each pole piece 18 includes a body portion 20 defined by an annular front portion 22, and first and second arms 24, 26 projecting laterally from the body portion. The pole piece 18 also includes a winding receiving portion 28 that extends radially outwardly from the annular front portion 22. When the core 10 is assembled and the pole pieces 18 are secured in place, the pole pieces, which are aligned and stacked, form a pole column, that is vertical relative to the core 10 and extends outwardly from the circumference of the core. The stator windings (not shown) are then wound about the pole. As shown in the drawings, the winding receiving portion 28 is shown as fragmentary or cut off. Accordingly, the winding receiving portion 28 may be of any suitable shape sufficient to accommodate the preferred number windings of wire.

Referring now to FIGS. 2–5, FIG. 5 shows a specific embodiment of a single pole piece 18 in alignment between two adjacent lugs 14. Note that the annular front portion 22 of the pole piece 18 abuts the outer circumferential edge 15 of the flux ring. When the pole piece 18 is aligned between two adjacent lugs 14, the arms 24, 26 abut corresponding opposite edges 30, 32 of the lug and extend along a portion of the outer circumferential edge 15. Note that the edges 30, 32 of the lug are deformable, as will be described below.

Referring now to FIGS. 2–6, FIG. 6 shows the pole piece 18 in alignment between two lugs 14 where the lug aperture 16 has been expanded to deform the lug. Note that for purposes of illustration only, a single pole piece 18 is shown fixed to a section of the flux ring 12. Preferably, in production, a stack of multiple pole pieces is affixed to a fully formed core 10 as a group, rather than in single fashion, as described below.

Referring now to FIGS. 1–7, FIG. 7 shows a plurality of pole pieces 18 stacked on top of each other to form a block-like structure. All of the pole pieces 18 are vertically aligned. The pole pieces 18 may be lightly clamped together, as is known in the art, or the stator winding (not shown) may be wound about the winding receiving portion 28 of the pole pieces to secure them in place. Alternatively, the windings may be wound about the stacked pole pieces prior to assembly with the yoke to achieve a greater winding density. Also, this permits a wider variety of winding methods to be used. The stack of pole pieces 18 is then aligned with the core 10. Note that the core 10 is fully formed, that is, all helical convolutions of flux rings 12 have been wound edgewise about the arbor and are fixed in place. The core 10 appears as a relatively cylindrical or doughnut-shaped structure. For example, depending upon the motor application, the core 10 may have a height of about one inch and a diameter of about four inches. As best shown in FIG. 1, the core 10 include lugs 14 projecting outwardly from the outside circumference of the core, which are also aligned vertically along the circumference of the core.

Next, the stack of pole pieces 18 is positioned and aligned between adjacent lugs 14 on the core 10 so that the annular front portion 22 of the pole pieces 18 abut the outer circumferential edge 15 of the flux rings 12. This may be done by automatic means, as is known in the art.

Once the stack of pole pieces 18 is aligned between the lugs 14 and is in abutment with the outer circumferential edge 15 of the flux rings 12, the deformable edges 30, 32 of the lugs 14 are deformed and expand to overlap a portion of the arms 24, 26 and wedge pole pieces 18 between the circumferential edge of the flux ring and the lugs, as will be described below. The deformable edges 30, 32 are deformed about the arms 24, 26 of each pole piece 18 and along the entire vertical height of the stack of pole pieces. Note that for purposes of illustration in FIG. 6, such deformation is shown for a single pole piece 18, rather than for the stack of pole pieces. Because the material from which the flux ring 12 and the lugs are formed is relatively malleable, it deforms or spreads rather than cracks.

Referring now to FIGS. 1–8, FIG. 8 shows a specific embodiment of a deforming tool 40. To cause the deformable edges 30, 32 of the lug 14 to deform and expand, a deforming tool 40 is inserted into the lug apertures 16. The deforming tool 40 has a tapered portion 42 that is inserted into the lug apertures 16. A distal end 44 of the tapered portion 42 has a diameter less than the diameter of the lug apertures 16 so that it may be inserted into the lug apertures. A proximal end 46 of the tapered portion 42 has a diameter greater than a diameter of the lug apertures 16 so that when the tapered portion is inserted into the lug apertures, the proximal end 46 contacts the edge of the lug apertures. Additional downward pressure by the deforming tool against the lug aperture 16 causes the lug apertures to deform. This in turn deforms the deformable edges 30, 32 of the lugs 14 causing them to outwardly expand, as shown particularly in FIG. 6. This expanded portion 30, 32 locks or wedges the pole piece 18 against the outer circumferential edge 15 of the flux ring 12 and between adjacent lugs 14. Thus, the deforming tool is inserted fully into the throughbore defined the lug apertures 16. Note, however, that the lug apertures 16, although deformed from their original shape, remain open. That is, no fastener, bolt, rivet and the like remains in the throughbore defined by the lug apertures 16. Indeed, no fastener, bolt or rivet is needed because the deformed edges 30, 32 of the lugs 14 fix the pole pieces 18 in place along the entire vertical height of the pole pieces 18. Note, however, that the lugs and the lug apertures, while aligned, need not be in perfect alignment. Accordingly the throughbore need not have a perfectly smooth inside contour, as there may be some alignment variations from layer to layer. Because each lug expands independently from adjacent lugs (or any other lugs), each pole piece is securely fastened to the yoke.

The lug apertures 16, may be, for example 0.0625 inches in diameter. Of course, the tapered portion 42 of the deforming tool 40 has an initial diameter of less than 0.0625 inches and increases in diameter to greater than 0.0625 inches. Any suitable taper gradient may be used depending upon the compressive force applied and the structural strength of the material of the flux ring 12. Of course, the assembly machine that performs the edgewise winding of the flux rings, described in U.S. Pat. No. 4,909,057, may include multiple deforming tools 40 so that multiple pole pieces 12 are operatively secured to the flux ring 12 at one time.

Note that although the flux ring 12 is formed of ferromagnetic material, the pole pieces 18 need not be formed of ferromagnetic material. For example, depending upon the specific motor configuration, the pole pieces 18 may be formed of aluminum or other non-ferromagnetic material.

Specific embodiments of a stator flux ring having fastenable pole pieces according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A stator assembly comprising:

a plurality of flux rings in the form of helical convolutions wound edgewise from a continuous strip ferromagnetic material to form a stator core;

each flux ring having a plurality of spaced apart integrally formed lugs outwardly extending along an outer circumferential edge of the flux ring;

each lug having deformable edges;

a plurality of pole pieces, each having a body portion defined by an annular front portion, and first and second arms projecting laterally from the body portion and extending along a portion of the outer circumferential edge;

each pole piece operatively secured between two adjacent lugs such that the annular front portion abuts the outer circumferential edge of the flux ring, and the arms abut the corresponding deformable edges of the lug; and wherein a portion of the deformable edges of the lug are deformed and expand to overlap the arms and wedge the pole pieces between the circumferential edge and the lugs.

2. The assembly of claim 1 wherein the body portion of each pole piece includes a winding-receiving portion disposed opposite the annular front portion and extending radially outwardly from the outer circumferential edge of the flux ring, the winding-receiving portion configured to receive a portion of a stator winding.

3. The assembly of claim 1 further including a lug aperture formed in each lug.

4. The assembly of claim 3 wherein the lug aperture is configured to receive a deforming tool that causes the aperture to expand and deform the deformable edges of the lug.

5. The assembly of claim 1 wherein the portion of the lug that overlaps the arms of the pole piece fixedly secures the pole piece to the flux ring.

6. The assembly of claim 3 wherein the lug aperture is configured to receive a deforming tool that expands the lug aperture causing the deformable edges to expand.

7. The assembly of claim 6 wherein the deforming tool has a tapered portion configured to be received within the lug apertures.

8. The assembly of claim 7 wherein a distal end of the tapered portion has a diameter less than a diameter of the lug aperture.

9. The assembly of claim 7 wherein a proximal end of the tapered portion has a diameter greater than a diameter of the lug aperture, such that the proximal end causes the lug aperture to expand when inserted into the lug aperture.

10. The assembly of claim 1 wherein the flux rings and the pole pieces are formed of ferromagnetic material.

11. The assembly of claim 1 wherein the flux rings are formed of ferromagnetic material.

12. The assembly of claim 1 wherein the pole pieces are not formed of ferromagnetic material.

* * * * *